Figures 1, 2:
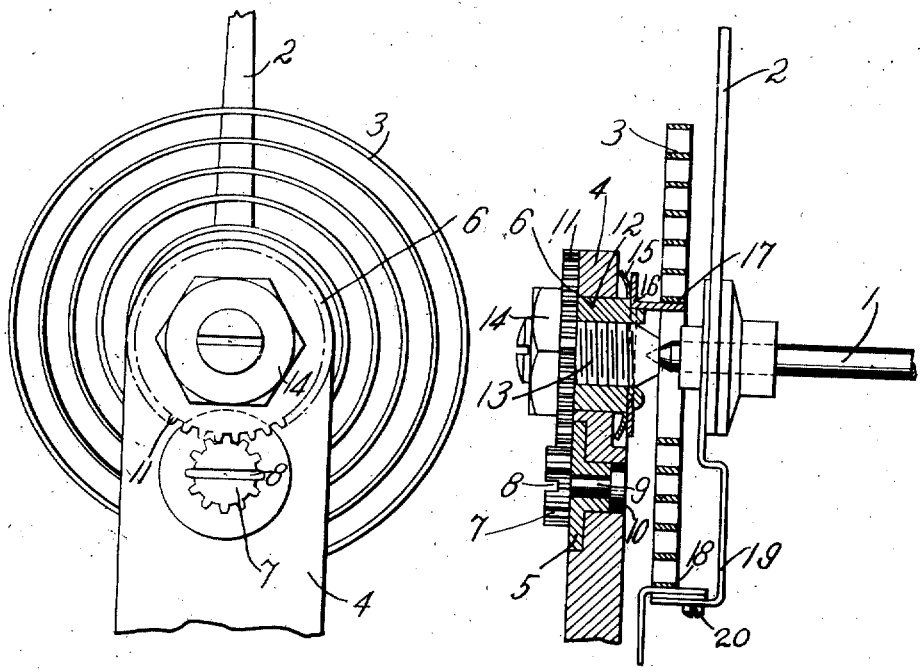

P. MacGAHAN.
ELECTRICAL MEASURING INSTRUMENT.
APPLICATION FILED JULY 29, 1913.

1,229,767.

Patented June 12, 1917.

WITNESSES:
Fred A. Lind.
J H Procter

INVENTOR
Paul MacGahan
BY
Wesley G. Carr
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,229,767.  Specification of Letters Patent.  Patented June 12, 1917.

Application filed July 29, 1913. Serial No. 781,748.

*To all whom it may concern:*

Be it known that I, PAUL MacGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments, and particularly to improvements in spring adjusting devices therefor.

The object of my invention is to provide a spring adjusting device for electrical measuring instruments that will admit of a wide range of adjustments.

Spring adjusting devices have heretofore been provided that admit of adjustment of the zero position over a relatively narrow range. If the movement of the spring through a relatively narrow range did not sufficiently adjust it, the length of the spring had to be varied by moving the spring holder. This required a change in the constant of the instrument as well as delicate handling and was usually a source of trouble. In my invention, I provide means for adjusting the zero position of a spring over any range without changing the length and consequent counter-torque of the spring, and I also provide means for permitting these adjustments to be made in small increments to admit of accurate adjustment with ease. I also provide means whereby the length, and thus the strength, of the spring may be readily adjusted without interfering with the action of the zero-adjusting feature.

In the accompanying drawings, Figure 1 is a fragmentary plan view of a measuring instrument wherein is embodied my invention, and Fig. 2 is a sectional view of a spring adjusting device embodying my invention.

Referring to the drawings, my invention is embodied in an electrical measuring instrument having a shaft 1, a pointer 2, a spring 3 and a supporting arm 4. The supporting arm 4 is drilled to receive a bushing 5 and a gear wheel member 6. The bushing 5 supports a pinion 7 having a slot 8 in the top thereof. The pinion 7 is held in the bushing 5 by a shaft 9 that has a shoulder 10 thereon. The gear wheel member 6 comprises a gear wheel 11 that engages the pinion 7, and a cylindrical sleeve or projection 12 that is internally threaded to receive a jewel screw 13 that is provided with a lock nut 14 for holding it in position. To the lower end of the sleeve 12 is attached a spring washer 15 that secures the gear wheel member 6 to the supporting arm 4 in such a way as to prevent it from moving except when manually operated. A washer 16 is attached to the sleeve 12 to hold the spring washer 15 in place and to support the inner end 17 of the spring 3, the other end 18 of which or any intermediate point thereof is attached to an arm 19 projecting from the shaft 1 by a screw 20.

To adjust the spring 3, the pinion 7 is rotated by turning a screw driver which is inserted in the slot 8. This causes the gear wheel 11 and the sleeve 12 to rotate and carry with them the washer 16 which, as hereinbefore stated, has attached to it the inner end of the spring 3, thus adjusting the position of the spring 3 without changing its length. Very accurate adjustment of the spring may be had by using my invention. A novel feature of my invention is the method of suspending the rotatable member of the instrument, the jewel screw 13 inserted in the gear wheel member 6 serving this purpose.

Any change in the mechanical structure, shape, size and materials of my invention, as hereinbefore described, will not depart from its scope as covered by the appended claims.

I claim as my invention:

1. In an electrical measuring instrument, the combination with a rotatable shaft, of a spring having one end attached to the rotatable shaft, a pinion, a gear wheel in engagement with the said pinion, and means connected to the said gear wheel for restraining the same and for operatively connecting the other end of the spring thereto.

2. In an electric measuring instrument, the combination with a rotatable member, of a pinion, a gear wheel having a projection and adapted to be rotated through any angle, and a bearing for the rotatable member, said bearing being mounted in the gear wheel projection.

3. In an electrical measuring instrument, the combination with a rotatable member, of a pinion, a gear wheel having a projection and adapted to engage the pinion, a jewel bearing for the rotatable member that is mounted in the gear wheel projection, and means for restraining the gear wheel in any position.

4. In an electrical measuring instrument, the combination with a rotatable shaft, of a pointer attached to the said shaft, a projecting arm on the said shaft, a spring having one end attached to the said projecting arm, a pinion, a gear wheel in engagement with the said pinion, and means connected to the said gear wheel for restraining the same and for operatively connecting the other end of the said spring to the said gear wheel.

5. In an electrical measuring instrument, the combination with a rotatable member, of a supporting member, a pinion journaled in said supporting member, a gear wheel having a cylindrical projection thereon and adapted to be rotated through any angle, said projection being journaled in the said supporting member, and a bearing for the said rotatable member carried by the projection on the said gear wheel.

6. In an electrical measuring instrument, the combination with a rotatable member, of a supporting member, a pinion journaled in the said supporting member, a gear wheel having a cylindrical projection thereon and adapted to engage the said pinion, said projection being journaled in the said supporting member, a jeweled bearing for the said rotatable member, said jeweled bearing being inserted in the projection on the said gear wheel, and a spring having one end attached to the said rotatable member and the other end to the projection on the said gear wheel.

7. In an electrical measuring instrument, the combination with a rotatable member, of a pinion, a gear wheel having a projection and adapted to engage the said pinion, a bearing member for the said rotatable member that is mounted in the gear wheel projection, and a spring having one end attached to the said rotatable member and the other end attached to the gear wheel projection.

8. In an electrical measuring instrument, the combination with a rotatable shaft, of a spring having one end attached to the rotatable shaft, means for adjustably controlling the spring, and means connected to the said controlling means for restraining the same and for operatively connecting the other end of the spring to the controlling means.

9. In an electrical measuring instrument, the combination with a rotatable shaft, of a control spring having one of its ends attached to the rotatable shaft, a pinion, a gear wheel in engagement with the said pinion, a spring washer for restraining the gear wheel, and means connected to the gear wheel for supporting the spring washer and for operatively connecting the other end of the control spring to the gear wheel.

In testimony whereof, I have hereunto subscribed my name this 24th day of July 1913.

PAUL MacGAHAN.

Witnesses:
T. C. Thomson,
B. B. Hines.